(12) United States Patent
Bell et al.

(10) Patent No.: US 8,538,577 B2
(45) Date of Patent: Sep. 17, 2013

(54) METHOD AND APPARATUS FOR SENSING OBJECT LOAD ENGAGEMENT, TRANSPORTATION AND DISENGAGEMENT BY AUTOMATED VEHICLES

(75) Inventors: Jamie Bell, Auckland (NZ); Kashyap Chandrasekar, Auckland (NZ); Andres Evan Graham, Waitakere (NZ); David Charles Howse, North Shore (NZ)

(73) Assignee: Crown Equipment Limited, Auckland (NZ)

( * ) Notice: Subject to any disclaimer, the term of this patent is extended or adjusted under 35 U.S.C. 154(b) by 830 days.

(21) Appl. No.: 12/718,620

(22) Filed: Mar. 5, 2010

(65) Prior Publication Data

US 2011/0218670 A1 Sep. 8, 2011

(51) Int. Cl.
*G06F 7/00* (2006.01)

(52) U.S. Cl.
USPC ........... 700/215; 700/226; 700/213; 700/214; 700/225; 414/273

(58) Field of Classification Search
None
See application file for complete search history.

(56) References Cited

U.S. PATENT DOCUMENTS

| | | | |
|---|---|---|---|
| 4,855,915 A | 8/1989 | Dallaire | |
| 4,858,132 A | 8/1989 | Holmquist | |
| 5,011,358 A * | 4/1991 | Andersen et al. | 414/273 |
| 5,051,906 A | 9/1991 | Evans, Jr. et al. | |
| 5,170,352 A | 12/1992 | McTamaney et al. | |
| 5,202,832 A | 4/1993 | Lisy | |
| 5,471,393 A | 11/1995 | Bolger | |
| 5,491,670 A | 2/1996 | Weber | |
| 5,539,638 A | 7/1996 | Keeler et al. | |
| 5,568,030 A | 10/1996 | Nishikawa et al. | |
| 5,612,883 A | 3/1997 | Shaffer et al. | |
| 5,646,845 A | 7/1997 | Gudat et al. | |
| 5,682,317 A | 10/1997 | Keeler et al. | |
| 5,916,285 A | 6/1999 | Alofs et al. | |
| 5,938,710 A | 8/1999 | Lanza et al. | |
| 5,961,571 A | 10/1999 | Gorr et al. | |
| 6,012,003 A | 1/2000 | Astrom | |
| 6,092,010 A | 7/2000 | Alofs et al. | |
| 6,208,916 B1 | 3/2001 | Hori | |

(Continued)

FOREIGN PATENT DOCUMENTS

| | | |
|---|---|---|
| DE | 19757333 C1 | 9/1999 |
| DE | 10220936 A1 | 12/2003 |

(Continued)

OTHER PUBLICATIONS

Office Action from U.S. Appl. No. 12/948,358 mailed Apr. 8, 2013.

(Continued)

*Primary Examiner* — Yolanda Jones
(74) *Attorney, Agent, or Firm* — Dinsmore & Shohl LLP

(57) ABSTRACT

A method and apparatus for sensing object load engagement, transportation and disengagement by automated vehicles is described. In one embodiment, the method includes processing data that is transmitted from a sensor array comprising at least one device for analyzing a plurality of objects that are placed throughout a physical environment, executing an object recognition process on the sensor array data using model information to identify at least one object, determining orientation information associated with the at least one object, wherein the orientation information is relative to the lift carriage and positioning at least one lifting element based on the orientation information.

15 Claims, 12 Drawing Sheets

(56) References Cited

U.S. PATENT DOCUMENTS

| | | |
|---|---|---|
| 6,246,930 B1 | 6/2001 | Hori |
| 6,308,118 B1 | 10/2001 | Holmquist |
| 6,539,294 B1 | 3/2003 | Kageyama |
| 6,592,488 B2 * | 7/2003 | Gassmann .................. 475/243 |
| 6,917,839 B2 | 7/2005 | Bickford |
| 6,952,488 B2 | 10/2005 | Kelly et al. |
| 7,148,458 B2 | 12/2006 | Schell et al. |
| 7,162,338 B2 | 1/2007 | Goncalves et al. |
| 7,177,737 B2 | 2/2007 | Karlsson et al. |
| 7,272,467 B2 | 9/2007 | Goncalves et al. |
| 7,539,563 B2 | 5/2009 | Yang et al. |
| 7,646,336 B2 | 1/2010 | Tan et al. |
| 7,679,532 B2 | 3/2010 | Karlsson et al. |
| 7,688,225 B1 | 3/2010 | Haynes et al. |
| 7,689,321 B2 | 3/2010 | Karlsson |
| 7,720,554 B2 | 5/2010 | DiBernardo et al. |
| 7,734,385 B2 | 6/2010 | Yang et al. |
| 7,844,364 B2 | 11/2010 | McLurkin et al. |
| 7,996,097 B2 | 8/2011 | DiBernardo et al. |
| 8,020,657 B2 | 9/2011 | Allard et al. |
| 8,050,863 B2 | 11/2011 | Trepagnier et al. |
| 8,103,383 B2 | 1/2012 | Nakamura |
| 8,126,642 B2 | 2/2012 | Trepagnier et al. |
| 8,150,650 B2 | 4/2012 | Goncalves et al. |
| 8,204,679 B2 | 6/2012 | Nakamura |
| 8,255,107 B2 | 8/2012 | Yang et al. |
| 8,280,623 B2 | 10/2012 | Trepagnier et al. |
| 2004/0030493 A1 | 2/2004 | Pechatnikov et al. |
| 2004/0202351 A1 | 10/2004 | Park et al. |
| 2004/0249504 A1 | 12/2004 | Gutmann et al. |
| 2005/0149256 A1 | 7/2005 | Lawitzky et al. |
| 2005/0182518 A1 | 8/2005 | Karlsson |
| 2006/0181391 A1 | 8/2006 | McNeill et al. |
| 2006/0184013 A1 | 8/2006 | Emanuel et al. |
| 2007/0061043 A1 | 3/2007 | Ermakov et al. |
| 2007/0090973 A1 | 4/2007 | Karlsson et al. |
| 2007/0106465 A1 | 5/2007 | Adam et al. |
| 2007/0150097 A1 | 6/2007 | Chae et al. |
| 2007/0153802 A1 | 7/2007 | Anke et al. |
| 2007/0213869 A1 | 9/2007 | Bandringa et al. |
| 2007/0262884 A1 | 11/2007 | Goncalves et al. |
| 2009/0140887 A1 | 6/2009 | Breed et al. |
| 2009/0216438 A1 | 8/2009 | Shafer |
| 2010/0161224 A1 | 6/2010 | Lee et al. |
| 2010/0222925 A1 | 9/2010 | Anezaki |
| 2010/0256908 A1 | 10/2010 | Shimshoni et al. |
| 2010/0268697 A1 | 10/2010 | Karlsson et al. |
| 2011/0010023 A1 | 1/2011 | Kunzig et al. |
| 2011/0121068 A1 | 5/2011 | Emanuel et al. |
| 2011/0125323 A1 | 5/2011 | Gutmann et al. |
| 2011/0150348 A1 | 6/2011 | Anderson |
| 2011/0153338 A1 | 6/2011 | Anderson |
| 2011/0230207 A1 | 9/2011 | Hasegawa |
| 2012/0035797 A1 | 2/2012 | Oobayashi et al. |
| 2012/0101784 A1 | 4/2012 | Lindores et al. |
| 2012/0191272 A1 | 7/2012 | Andersen et al. |
| 2012/0323431 A1 | 12/2012 | Wong et al. |
| 2013/0006420 A1 | 1/2013 | Karlsson et al. |

FOREIGN PATENT DOCUMENTS

| | | |
|---|---|---|
| DE | 10234730 A1 | 2/2004 |
| DE | 102007021693 A1 | 11/2008 |
| EP | 0 508 793 A2 | 9/1992 |
| EP | 1732247 A1 | 12/2006 |
| GB | 2389947 A | 12/2003 |
| JP | 60067818 A | 4/1985 |
| JP | 2002048579 A | 2/2002 |
| JP | 2002108446 A | 4/2002 |
| JP | 2005114546 A | 4/2005 |
| WO | 03/042916 A1 | 5/2003 |
| WO | 03096052 A2 | 11/2003 |

OTHER PUBLICATIONS

International Search Report and Written Opinion mailed Dec. 7, 2011 for PCT Application No. PCT/NZ2011/000024.
Office Action from U.S. Appl. No. 13/159,501 mailed Jan. 10, 2013.
Office Action from U.S. Appl. No. 12/660,616 mailed Nov. 27, 2012.
"Three Engineers, Hundreds of Robots, One Warehouse," Guizzo, IEEE Spectrum, Jul. 2008.
Office Action from U.S. Appl. No. 13/116,600 mailed Dec. 31, 2012.
Search Report/Written Opinion from PCT/NZ2012/000051 mailed Jan. 2, 2013.
Search Report/Written Opinion from PCT/NZ2012/000091 mailed Oct. 31, 2012.
Search Report/Written Opinion from PCT/US2012/054062 mailed Nov. 27, 2012.
Search Report/Written Opinion from PCT/US2012/052247 mailed Nov. 27, 2012.
Borenstein et al. "Mobile Robot Positioning—Sensors and Techniques", Journal of Robotic Systems, Special Issue on Mobile Robots, vol. 14, No. 4, pp. 231-249, Apr. 1997.
Harmon et al., "A Technique for Coordinating Autonomous Robots", Autonomous Systems Branch Naval Ocean Systems Center San Diego, CA 92152, 1986.
Jansfelt et al., "Laser Based Position Acquisition and Tracking in an Indoor Environment", Proc. Int. Symp. Robotics and Automation, 1998.
Siadat et al., "An Optimized Segmentation Method for a 2D Laser-Scanner Applied to Mobile Robot Navigation", Proceedings of the 3rd IFAC Sympo9sium on Intelligent Components and Instruments for Control Applications, 1997.
Office Action pertaining to U.S. Appl. No. 131159,500, dated Mar. 26, 2013.
Office Action pertaining to U.S. Appl. No. 13/219,271, dated Feb. 25, 2013.
Office Action pertaining to U.S. Appl. No. 13/153,743, dated Mar. 4, 2013.
International Search Report and Written Opinion pertaining to International Patent Application No. PCT/NZ2012/000084, dated Jan. 30, 2013.
Office Action mailed May 8, 2013 from U.S. Appl. No. 13/672,260, filed Nov. 8, 2012.
Office Action mailed Jun. 4, 2013 from U.S. Appl. No. 13/159,501, filed Jun. 14, 2011.
Office Action mailed Jul. 12, 2013 from U.S. Appl. No. 13/227,165, filed Sep. 7, 2011.

* cited by examiner

METHOD AND APPARATUS FOR SENSING OBJECT LOAD ENGAGEMENT, TRANSPORTATION AND DISENGAGEMENT BY AUTOMATED VEHICLES

BACKGROUND OF THE INVENTION

1. Field of the Invention

Embodiments of the present invention generally relate to task automation within physical environments and more particular to a method and apparatus for sensing object load engagement, transportation and disengagement by automated vehicles.

2. Description of the Related Art

Entities regularly operate numerous manufacturing and storage facilities in order to meet supply and/or demand goals. For example, small to large corporations, government organizations and/or the like employ a variety of logistics management and inventory management paradigms to move objects (e.g., raw materials, goods, machines and/or the like) into a variety of physical environments (e.g., warehouses, cold rooms, factories, plants, stores and/or the like). A multinational company may build warehouses in one country to store raw materials for manufacture into goods, which are housed in a warehouse in another country for distribution into local retail markets. The warehouses must be well-organized in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. These tasks include object handling tasks, such as moving pallets of goods to different locations in a timely manner within a warehouse. For example, to facilitate object handling, most warehouses employ a large number of forklift drivers and forklifts to move objects. In order to increase productivity, these warehouses simply add more forklifts and forklift drivers. However, the additional employees and equipment create an inelastic additional cost, i.e., once hired, the additional employees and equipment cannot be removed.

Some warehouses utilize equipment for performing these tasks in order to increase productivity and reduce human intervention. As an example, these warehouses may employ vehicles, such as automated forklifts, to lift and carry object loads on routes (e.g., pre-programmed paths). During normal manual operation, a human operator would ascertain an orientation or pose of a particular object, such as a pallet or a rack system. Then, the human operator would direct two or more forks into an orientation matching the object load orientation. In this manner, the forks would be optimally positioned to engage a pallet at the entry points and/or unload the pallet onto a destination, such as a rack system shelf. Human operators, however, often make mistakes or cannot correctly ascertain the object load orientation.

Currently, the automated forklifts and human operators cannot accurately determine object load orientation, especially, when the object load is stored at a raised position. For example, if several object loads are stacked on top of each other or in high racking, a conventional automated forklift or human operator cannot ascertain the object pose above a certain load height. In many cases, a bottom object load orientation differs from a top object load orientation. Variations throughout a warehouse floor prevent correct object orientation computation because an object, such as a pallet, has different poses when placed at various locations. A poorly constructed warehouse floor or an uneven local terrain, for instance, disrupts effective automation of warehouse tasks. In addition, when the object load is wrapped in plastic (i.e., shrink wrapped), conventional sensing technologies fail and cannot accurately determine the object load orientation Therefore, there is a need in the art for a method and apparatus for sensing object load engagement, transportation and disengagement by automated vehicles using orientation information.

SUMMARY OF THE INVENTION

Various embodiments of the present invention generally comprise a method and apparatus for sensing object load engagement, transportation and disengagement by automated vehicles. In one embodiment, a method of sensing object load engagement, transportation and disengagement by automated vehicles includes processing data that is transmitted from a sensor array comprising at least one device for analyzing a plurality of objects that are placed throughout a physical environment, executing an object recognition process on the sensor array data using model information to identify at least one object, determining orientation information associated with the at least one object, wherein the orientation information is relative to the lift carriage and positioning at least one lifting element based on the orientation information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present invention enable accurate and efficient environment sensing and object recognition. By matching object models against laser scanner data and camera data, information associated with a particular object load is identified, such as an orientation for engaging the object load that is relative to a lift carriage. Automated vehicle software uses the orientation information to position one or more lifting elements, such as forks, for optimal insertion into entry points of the object load. Then, the automated vehicle software uses path information to transport and place the object load at a target destination as describe further below.

Figure 1:
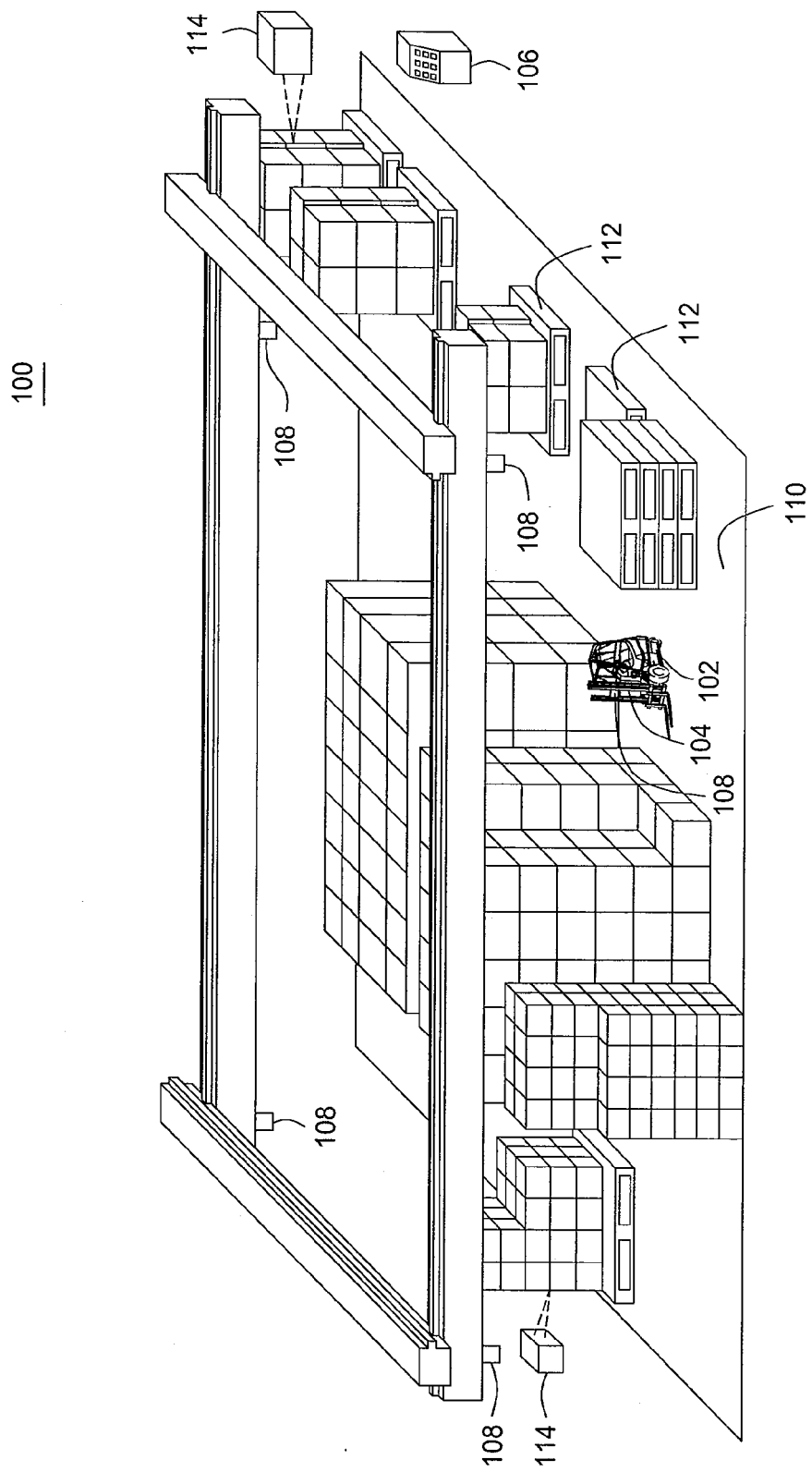
FIG. 1 is a perspective view of a physical environment for housing various objects according to various embodiments of the present invention.

FIG. 1 illustrates a schematic, perspective view of a physical environment 100 comprising one or more embodiments of the present invention.

In some embodiments, the physical environment 100 includes a vehicle 102 that is coupled to a mobile computer 104, a central computer 106 as well as a sensor array 108. The sensor array 108 includes a plurality of devices for analyzing various objects within the physical environment 100 and transmitting data (e.g., image data, video data, range map data, three-dimensional graph data and/or the like) to the mobile computer 104 and/or the central computer 106, as explained further below.

The physical environment 100 further includes a floor 110 upon which a plurality of objects occupy. The plurality of objects include a plurality of pallets 112, a plurality of units 114 and/or the like as explained further below. The physical environment 100 also includes various obstructions (not pictured) to the proper operation of the vehicle 102. Some of the plurality of objects form obstacles along paths for completing tasks. These obstacles may disrupt task completion on a given vehicle path. For example, an obstacle includes a broken pallet at a target destination associated with an object load being transported. The vehicle 102 may be unable to unload the object load unless the broken pallet is removed.

The physical environment 100 may include a warehouse for housing the plurality of units 114 in preparation for future transportation. Warehouses may include loading docks to load and unload the plurality of units from commercial vehicles, railways, airports and/or seaports. The plurality of units 114 generally include various goods, products and/or raw materials and/or the like that are usually placed on one or more pallets. For example, the plurality of units 114 may be consumer goods that are placed on ISO standard pallets and loaded into pallet racks by forklifts to be distributed to retail stores. The vehicle 102 facilitates such a distribution by moving the consumer goods to designated locations where other vehicles, (e.g., commercial trucks) load and subsequently deliver the consumer goods to one or more target destinations.

According to one or more embodiments, the vehicle 102 may be a forklift, such as an automated forklift, which is configured to handle and/or move the plurality of units 114 about the floor 110. The vehicle 102 utilizes one or more lifting elements, such as forks, to lift one or more units 114 and then, transport these units 114 along a path (e.g., a predefined route or a dynamically computed route) to be placed at a designated location. Alternatively, the one or more units 114 may be arranged on a pallet 112 of which the vehicle 102 lifts and moves to the designated location.

Each of the plurality of pallets 112 is a flat transport structure that supports goods in a stable fashion while being lifted by the vehicle 102 and/or another jacking device (e.g., a pallet jack and/or a front loader). The pallet 112 is the structural foundation of an object load and permits handling and storage efficiencies. Various ones of the plurality of pallets 112 may be utilized within a rack system (not pictured). Within a typical rack system, gravity rollers or tracks allow one or more units 114 on one or more pallets 112 to flow to the front. The one or more pallets 112 move forward until slowed or stopped by a retarding device, a physical stop or another pallet 112.

One or more computing devices are utilized to process sensor array data and execute tasks. In some embodiments, the mobile computer 104 and/or the central computer 106 control the vehicle 102 and perform various tasks within the physical environment 100. The mobile computer 104 is adapted to couple with the vehicle 102 as illustrated. The mobile computer 104 may also receive and aggregate data (e.g., laser scanner data, image data and/or any other related sensor data) that is transmitted by the sensor array 108. In some embodiments, various software modules within the central computer 106 and/or the mobile computer 104 determine orientation information associated with a particular object load (i.e., a pallet-size load) to be lifted. The orientation information includes measurements reflecting angular displacement and linear displacement about an x, y and z axes as explained further below. In some embodiments, these measurements define an entry point orientation associated with a pallet or a rack system. In another embodiment, these measurements may define a destination orientation associated with a target destination, such as a target pallet, for the particular object load.

After the orientation information is generated, the various software modules within the central computer 106 and/or the mobile computer 104 extract the measurements and position the one or more lifting elements, such as the forks. Based on these measurements, the lifting elements may be positioned to optimally engage the particular object load. For example, the various software modules may align the lifting elements with entry points for the pallet or a shelf within the rack system. As another example, the various software modules may position the lifting elements to match the destination orientation associated with the target destination such that the particular object load is unloaded properly and aligned with any other object located below the same target destination.

Figure 2:
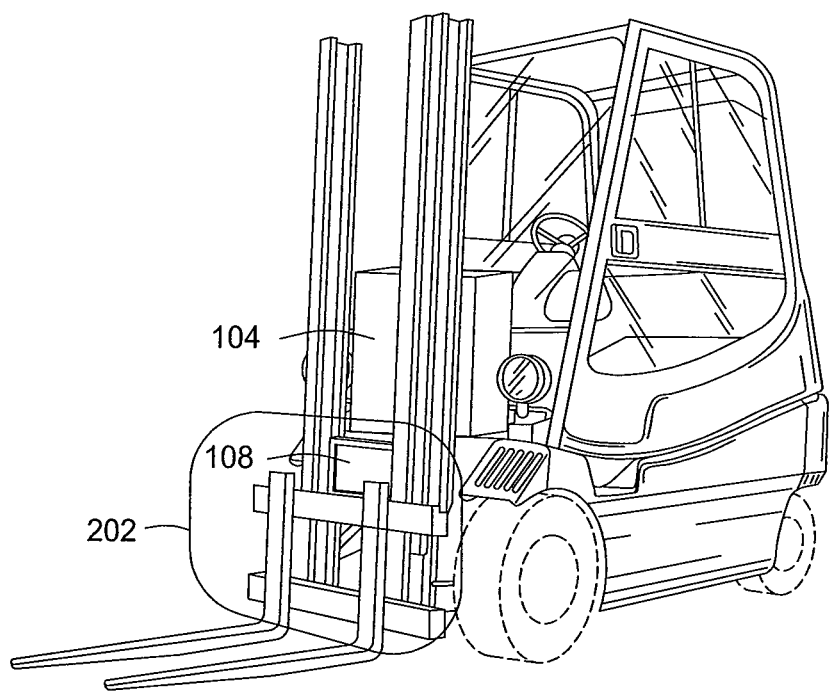
FIG. 2 is a perspective view of a forklift that performs various tasks by transporting object loads using orientation information according to various embodiments of the present invention.

FIG. 2 illustrates a perspective view of the forklift 200 for facilitating automation of various tasks within a physical environment according to one or more embodiments of the present invention.

The forklift 200 (i.e., a lift truck, a high/low, a stacker-truck, trailer loader, sideloader or a fork hoist) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The forklift 200 may travel inside a storage bay that is multiple pallet positions deep to place or retrieve a pallet. Orientation information (i.e., an entry point orientation) is used to guide the forklift 200 into the storage bay and place the pallet on cantilevered arms or rails. Hence, the dimensions of the forklift 200, including overall width and mast width, must be accurate when determining an orientation associated with an object and/or a target destination.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils and/or the like). In one embodiment, the forklift 200 includes hydraulics-powered, telescopic forks that permit two or more pallets to be placed behind each other without an aisle between these pallets.

The forklift 200 may further include various mechanic and/or hydraulic components according to one or more embodiments. In some embodiments, the forklift 200 includes one or more hydraulic components (not labeled) that permit lateral and/or rotational movement of two or more forks. In one embodiment, the forklift 200 includes a hydraulic component (not labeled) for moving the forks together and apart. In another embodiment, the forklift 200 includes a mechanical or hydraulic component for squeezing a unit (e.g., barrels, kegs, paper rolls and/or the like) to be transported. In some embodiments, the forklift 200 includes one or more hydraulic components (not labeled) that clamp or squeeze the forks around one or more units (e.g., cartons, boxes, bales and/or the like) in order to lift these units.

The forklift 200 may be coupled with the mobile computer 104, which includes software modules for operating the forklift 200 in accordance with one or more tasks. The task may be created using a prior knowledge of conditions within the physical environment. The forklift 200 is also coupled with the sensor array 108, which transmits data (e.g., image data, video data, range map data and/or three-dimensional graph data) to the mobile computer 104, which stores the sensor array data according to some embodiments. As described in detail further below, the sensor array 108 includes various devices, such as a laser scanner and a camera, for capturing the sensor array data associated with an object load.

The laser scanner and the camera may be mounted to the forklift 200 exterior. The laser scanner and the camera may articulate or move into various positions along the exterior. For example, the camera and the laser scanner may be attached to one or more forks such that image data and/or laser scanner data is captured moving up and down along with the forks. As another example, the camera and the laser scanner may be attached to a stationary position above or below the forks from which the image data and/or the laser scanner data is recorded depicting a view in front of the forklift 200. The front view may be used to identify obstacles at a target destination along a path and verify clearance after removal of such obstacles.

Figure 3:
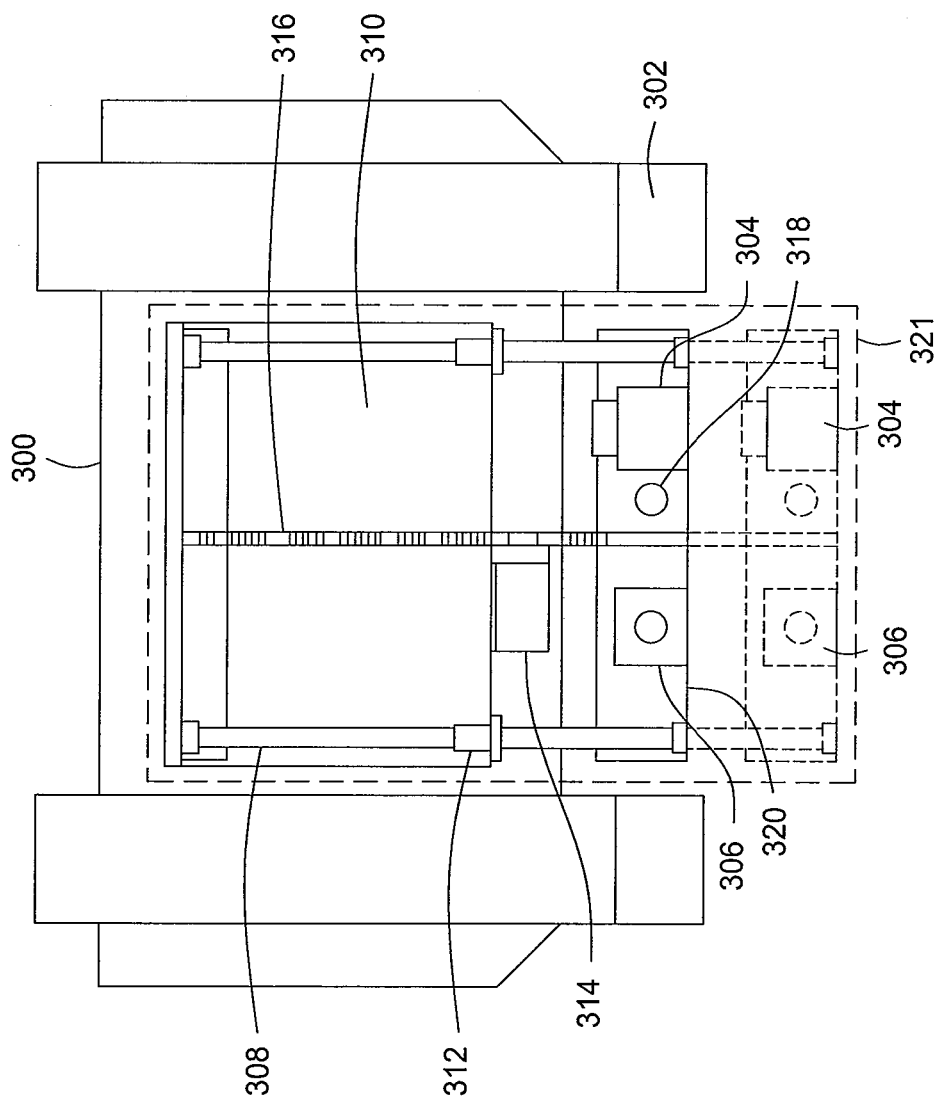
FIG. 3 is a partial view of a forklift according to various embodiments of the present invention.

FIG. 3 is a schematic of a partial view 202 of the forklift 200 according to one or more embodiments of the present invention. The partial view 202 illustrates a lift carriage 300 for supporting devices that capture sensor array data as well as lifting elements for engaging object loads according to various embodiments. It is appreciated that the following describes exemplary embodiments of the forklift 200 and the present invention includes other vehicle types and mechanical components.

The lift carriage 300 is designed to raise and lower one or more lifting elements, such as forks 302, vertically in order to engage and transport object loads. Between the forks 302, a scanner array 321 comprising one or more laser scanners 304 and one or more cameras 306 is fitted to the lift carriage 300 (e.g., the sensor array 108 of FIG. 1). The scanner array 321 may be mounted to the lift carriage 300 and retrofit object load sensing to the forklift 200. Because the presence of objects on the forks 302 may obscure the devices, the camera 306 and laser 304 may form a moveable sensor head 320 according to one embodiment. When the moveable sensor head 320 is moved into a retracted position, the camera 306 and the laser sensor 304 are positioned above the forks 302. The sensor head 320 is attached to a pair of guide rails 308, which are attached to the mounting plate 310 through two guide bushings 312.

As shown in FIG. 3, the laser scanner 304 and the camera 306 may be articulated between multiple positions including, as a minimum, locations above or below the forks 302. In some embodiments, the scanner array 321 includes various mechanical components that articulate (i.e., move) sensor head 320. For example, a ball screw is utilized to raise or lower the laser scanner 304 and the camera 306. A type of mechanical components being used for articulation may depend on physical attributes associated with the forklift 200 and/or installation requirements associated with a physical environment. As another example, a driven linear slide table is employed to transport the laser scanner 304 and the camera 306 into various positions.

Having the laser scanner 304 and/or the camera 306 located in certain positions relative to the lift carriage 300 provides these devices with a clear view beyond any object load being carried on the forks 302. Such positions further enable efficient data fitting between object models and sensor array data, which may be a combination of laser scanner data and image data, as explained further below. When the laser scanner 304 and the camera 306 are co-linear as well as orthogonal in the horizontal plane and coplanar in the vertical plane to an automated vehicle axis, various software modules can automatically cross correlate information between these devices, according to some embodiments. In another embodiment, when the laser scanner 304 and the camera 306 are not co-linear, the various software modules use geometric transformations to perform the correlation.

Furthermore, the laser scanner 304 and/or the camera 306 are used to enhance safety for the forklift 200 by identifying navigational hazards. The laser scanner data indicates locations of various obstructions along a path that are relative to the forklift 200. The identification of these obstructions facilitates path redetermination. Either the forklift 200 is rerouted around the identified obstructions or stopped until the identified obstructions are removed and the path is clear. The integration of the camera 306 enables environment sensing at the forklift 200. In addition, the laser scanner 304 and the camera 306 may operate with a light 318 to enhance obstruction identification.

A drive motor 314 connected to a gear, which engages a rack in a rack and pinion arrangement and moves the sensor head 320 to a location above the forks 302. The drive motor 314, alternatively, positions the sensor head 320 to a location below the forks 302. The laser scanner 304, the camera 306 and the drive motor 314 are coupled to a mobile computer (e.g., the mobile computer 104 of FIG. 1). In one or more alternative embodiments, the driver motor 314 rotates the sensor head 320 when capturing the sensor array data in order to identify objects or object loads that are not directly aligned with the forks 302. Various software modules within the mobile computer control the drive motor 314 and store image data and laser scanner data. The mobile computer communicates the image data and the laser scanner to a central computer where an object recognition process is executed to identify a particular object and generate orientation information as explained in detail further below.

In some alternative embodiments, the laser scanner 304 and the camera 306 may couple with the lift carriage 300 below the forks 302. Such a configuration may be used when approaching a target destination associated with the object load. For example, the target destination includes a rack system, a warehouse floor, a pallet and/or the like. At the location below the forks 302, the laser scanner 304 and the camera 306 are capable of capturing data at a warehouse floor level. Hence, the laser scanner 304 and the camera 306 provide visibility below any object load being transported by an automated vehicle, such as the forklift 200.

The laser scanner 304 and the camera 306 enable obstacle detection at the target destination because mounting these devices below the forks 302 allows various software modules to determine if the target destination is clear of any obstructions before unloading the object load. The various software modules search for such obstructions by examining the sensor array data. If the laser scanner does not detect any points then there are no obstructions above or near the target destination and the forklift 200 can unload the object load successfully. The various software modules may also examine the sensor array data associated with the target destination and determine characteristics regarding the surface on which the object load is to be placed, such as a destination orientation that is relative to the lift carriage 300.

Figure 4A:
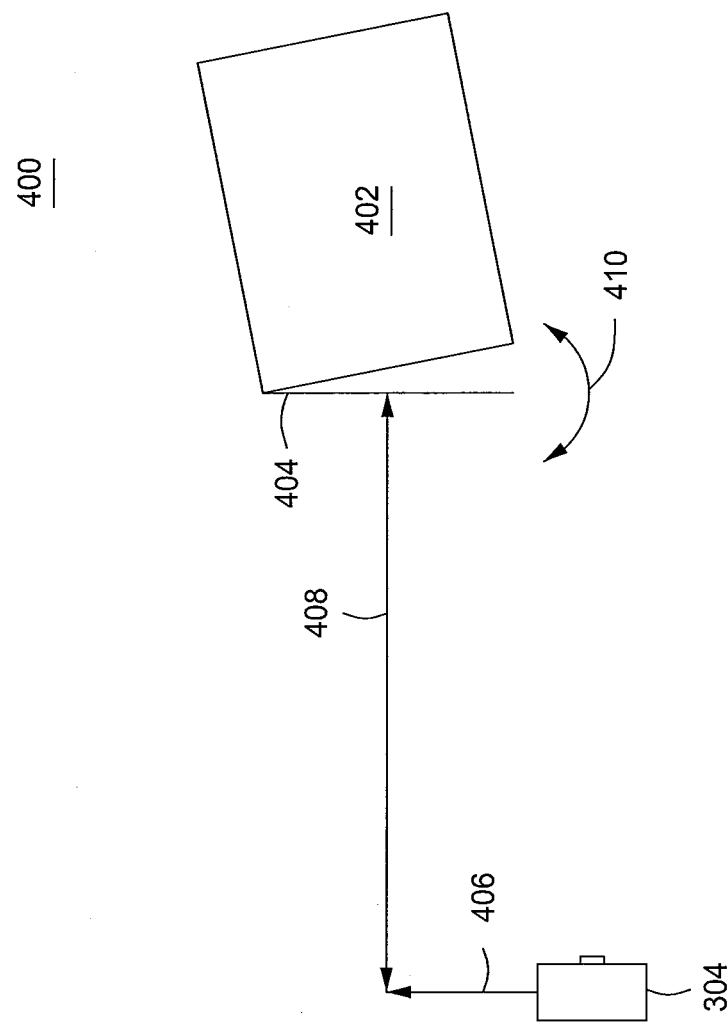
FIGS. 4A-B diagrammatically illustrate an orientation information generation process on an object load according to various embodiments of the present invention.
Figure 4B:
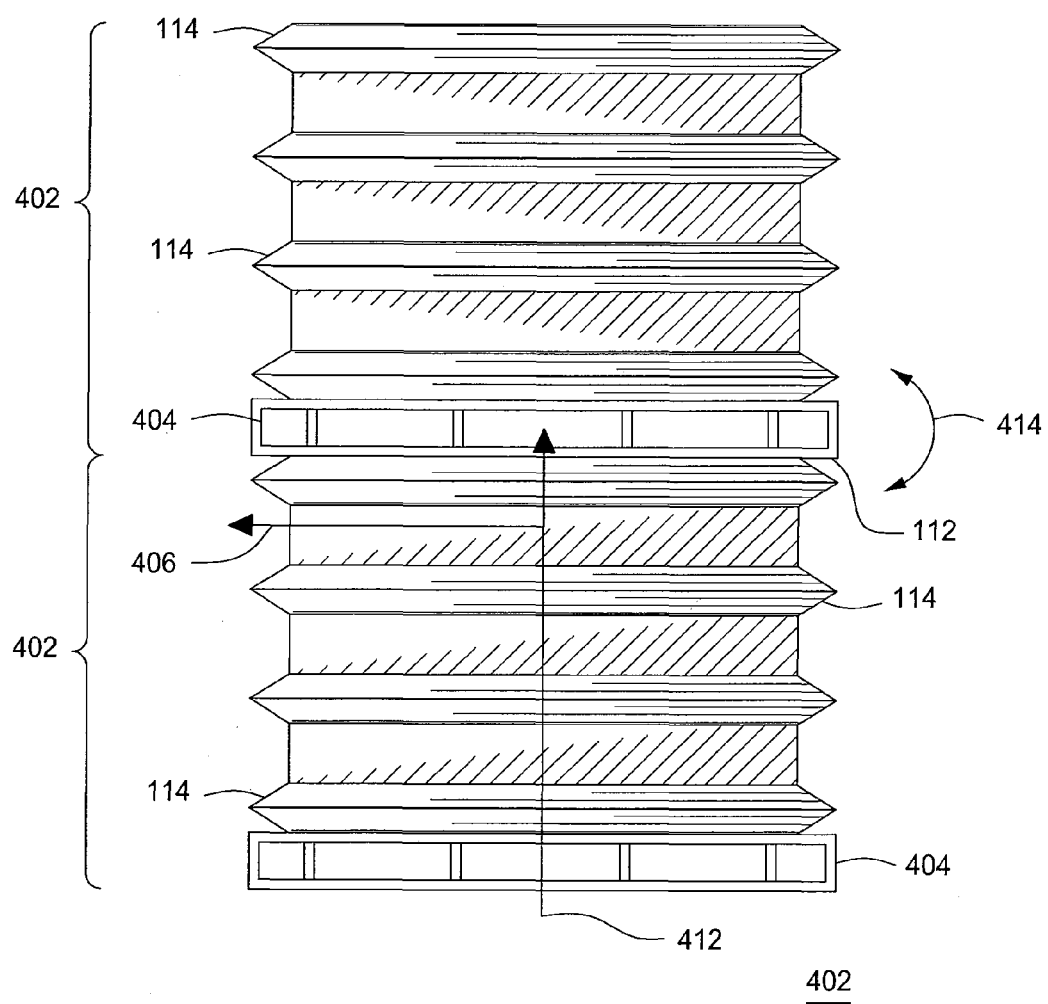

FIGS. 4A-B diagrammatically illustrate an orientation information generation process 400 on one or more object loads 402 according to various embodiments of the present invention. FIG. 4A represents a scanning procedure to generate laser scanner data of a horizontal plane (i.e., an x-y plane) comprising the object load 402. FIG. 4B is an image illustrating a vertical plane (i.e., a y-z plane) in front of multiple object loads 402. Each object load 402 is stacked on top of another object load 402 and includes the pallet 112 and several units 114. The laser scanner data and/or the image are used to determine relative distances from a forklift to the object loads 402.

Various software modules access sensor array data and execute the orientation information generation process 400 on various objects, such as the pallet 112, to determine an orientation associated with entry points for lifting and transporting the object loads 402. Once the orientation information generation process 500 identifies one of the object loads 402, the various software modules generate orientation information associated with entry points to the pallet 112. During the scanning procedure, the laser scanner 304 captures measurement data across an x-y plane with respect to one or more three-dimensional points on the pallet 112. In some embodiments, the laser scanner 304 computes distances between the forklift 200 and these points. The laser scanner 304 also computes distances between the points themselves. Various software modules correlate the captured data with image data gathered by the camera and apply an object recognition process to identify a matching pallet model.

Once the captured data is normalized with the matching pallet model, the various software modules compute one or more pose or orientation measurements. In some embodiments, the various software modules compute a distance between a pallet edge and a pallet center, which is stored as a Ty 406. In some embodiments, the Ty 406 is a displacement measurement across the y-axis that is relative to a current fork orientation. The laser scanner 304 computes a distance to the pallet center, which the various software modules store as a Tx 408. In some embodiments, the Tx 408 is a displacement measurement between the forklift 200 and the load 404 and may be used to calibrate the camera.

In some embodiments, the various software modules determine a value (e.g., angle of rotation in degrees or radians) that represents angular displacement about the z-axis for the pallet 112, which is stored as Rz 410. The Rz 410 may be determined by fitting the matching pallet model to the captured data in the x-y plane as illustrated in FIG. 4A. In some embodiments, the various software modules examine the image data and determine a displacement measurement across the z-axis, which is stored as Tz 412. Alternatively, the Tz 412 may also be computed by scanning the load 402 while moving the forks and searching for the matching pallet model. The various software modules may also estimate an angular displacement measurement about the y-axis (i.e. Ry) by evaluating laser scans while moving the forks vertically and comparing the laser scanner data with various pallet models and unit models. Alternatively, the angular displacement measurement about the y-axis may be determined from image data for the load 402.

In some embodiments, the various software modules process the image data from the camera and extract various features of the load 402, such as the entry points of the pallet 112. These features are compared with various object models in order to identify a matching object model, such as a matching pallet model and/or a matching load model. The various object models may be used to train the various software modules to recognize a given object, such as a pallet, a loads and/or a rack system. Alternatively, the various software modules may employ one or more feature extraction procedures, such as line detection, edge detection or gradient processing, to identify the object within an image.

Figure 5A:
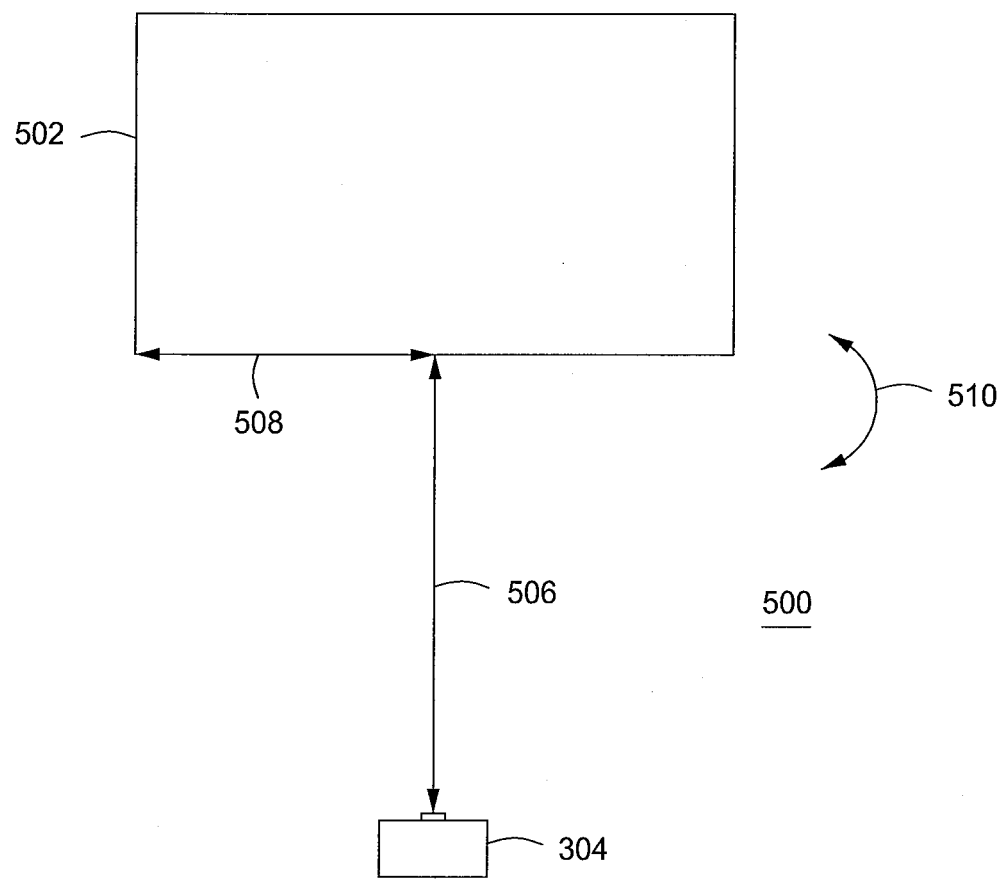
FIGS. 5A-B diagrammatically illustrate an orientation information generation process on a rack system according to various embodiments of the present invention.
Figure 5B:
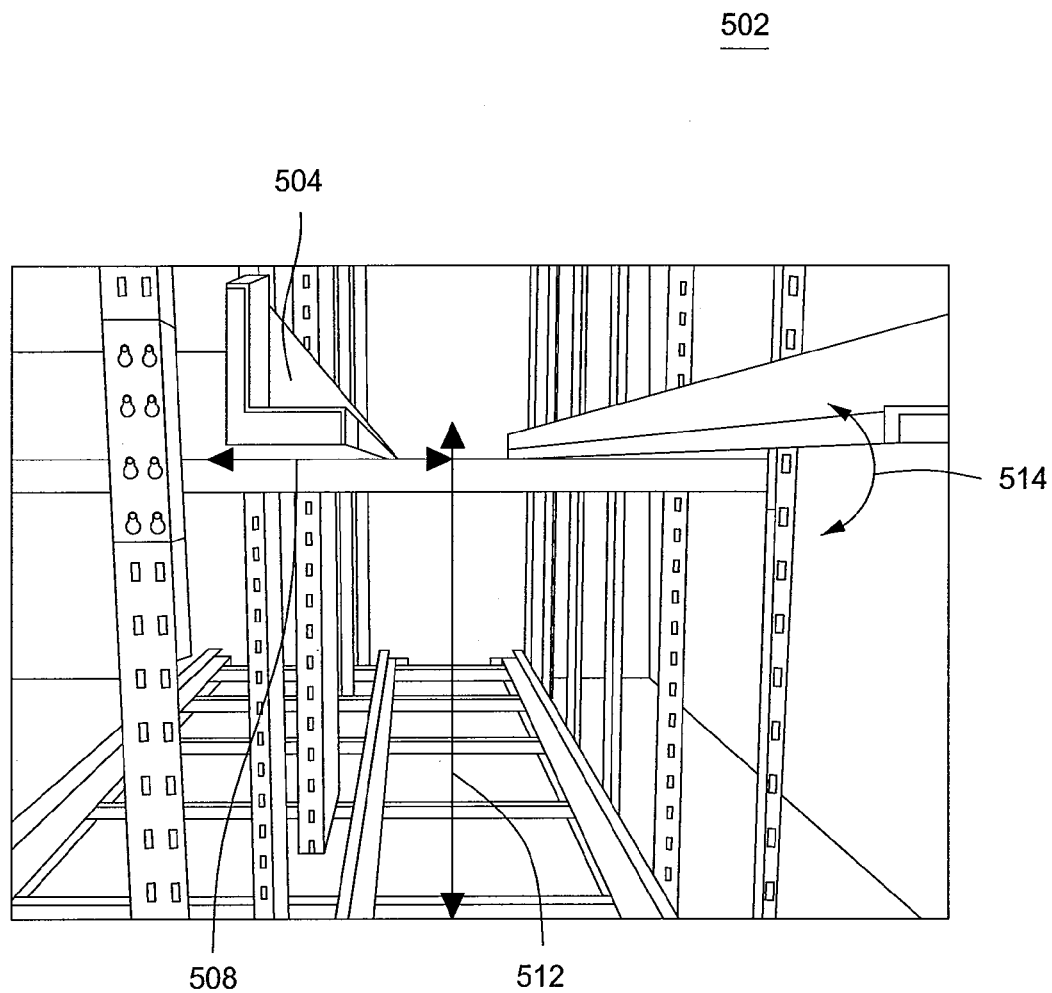

FIGS. 5A-B diagrammatically illustrate orientation information generation process 500 on a rack system 502 according to various embodiments of the present invention. FIG. 5A illustrates a scanning process to generate laser scanner data for a horizontal plane (i.e., an x-y plane) comprising the rack system 502. FIG. 5B is an image illustrating a vertical plane (i.e., a y-z plane) in front of the rack system 502. The laser scanner data and/or the image are used to determine relative distances from a forklift to the rack system 502. A portion of the rack system 502 may be a target destination for an object load (e.g., the object 402 of FIG. 4) as explained further below.

Once an object recognition process identifies the rack system 502 by comparing rack system models with data captured by the laser scanner 304 and a camera, various software modules define an entry point orientation associated with a shelf 504 within the rack system 502. In some embodiments, the entry point orientation includes numerous measurements indicating angular displacement, such as Ry, Rx 514 and Rz 510, and linear displacement, such as Ty 508, Tx 506 and Tz 512, about the x, y and z-axes. Some of these measurements (e.g., Ry) may be nominal due to structural integrity of the rack system 502. On the other hand, the angular displacement measurements may be used to correct for errors in the entry point orientation.

The various software modules cooperate to identify and locate the shelf 504 in a coordinate system, relative to the automated vehicle, using values for the linear displacement measurements Tx 506, Ty 508 and Tz 512. The value for the Tx 506 may refer to a depth at which an object load is to be placed and/or engaged. The various software modules also cooperate to determine values for the angular displacement measurements Rx 514 and Rz 510 of the shelf 504. Furthermore, the various software modules determine whether a pallet or another object load is occupying a target destination prior to placing the object load.

As shown in FIG. 5A, the laser scanner 304 captures the laser scanner data regarding a lift carriage height and vehicle orientation relative to the rack system 502 face. The laser scanner data is used to evaluate an entry point orientation of the shelf 504 and position the object load being transported accordingly. In addition to the linear displacement measurements, the laser scanner data includes distances to one or more points on the rack system 502 as described in the present disclosure. The various software modules fit a matching rack system model with these distances to compute the value for Rz 510.

Then, the various software modules fit the matching rack system against the image as depicted in FIG. 5B to compute the value for Rx 514. In one embodiment, feature extraction processing techniques, such as edge detection, may be utilized to identify the rack system 502 and compute the various measurements that constitute the entry point orientation of the shelf 504. In some embodiments, the various software modules employ rack system model training to identify the rack system 502 and define the entry point orientation associated with the shelf 504. Using rack system model images, the various software modules are trained to determine the linear and angular displacement measurements as explained in the present disclosure. These measurements are subsequently transposed from the laser scanner 304 origin to the automated vehicle origin.

Figure 6:
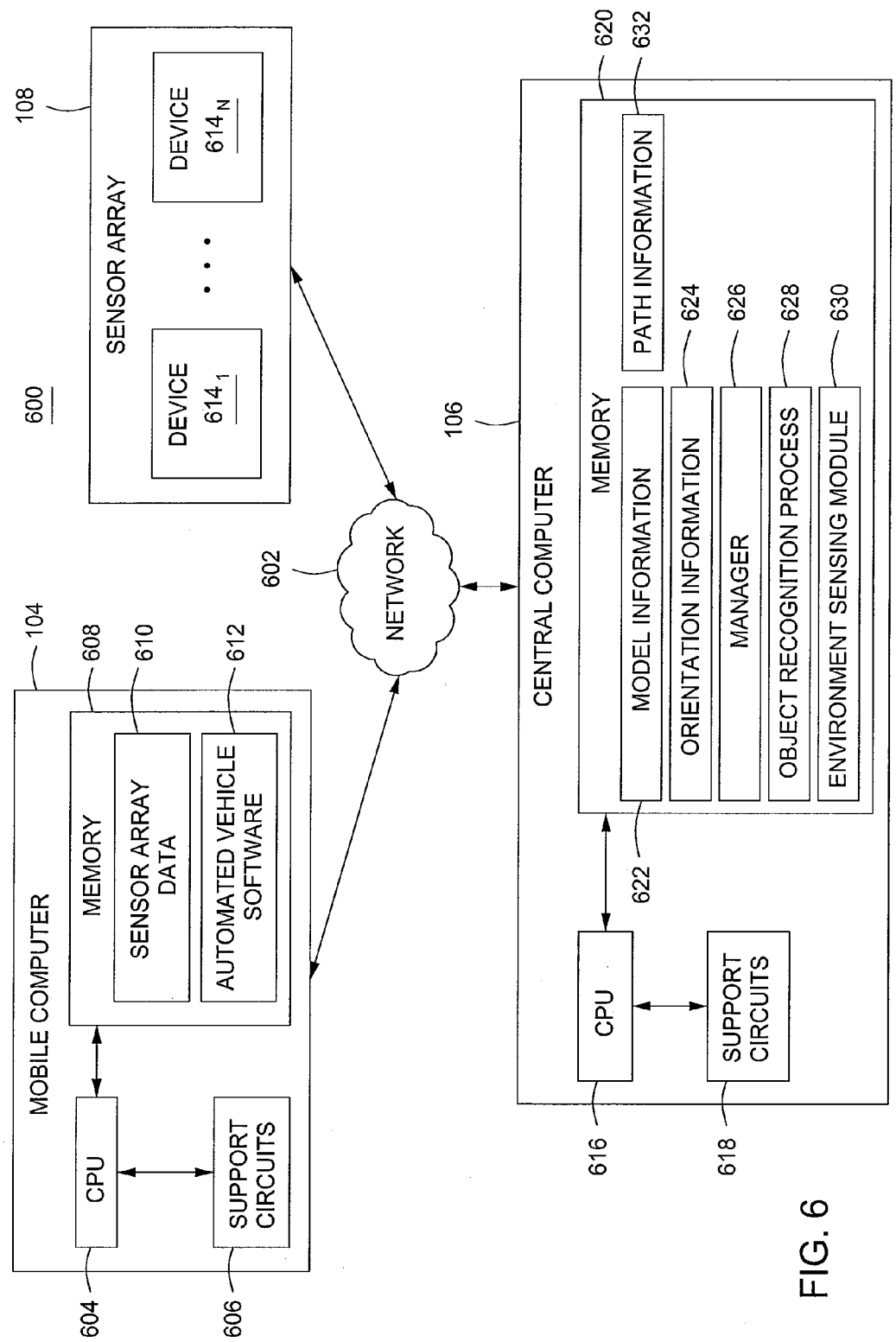
FIG. 6 is a block diagram of a system for sensing object load engagement, transportation and disengagement by automated vehicles according to various embodiments of the present invention.

FIG. 6 is a block diagram of a system 600 for sensing object load engagement, transportation and disengagement by automated vehicles according to various embodiments of the present invention. In some embodiments, the system 600 includes the mobile computer 104, the central computer 106 and the sensor array 108 in which each component is coupled to each other through a network 602.

The mobile computer 104 is a type of computing device (e.g., a laptop, a desktop, a Personal Desk Assistant (PDA) and the like) that comprises a central processing unit (CPU) 604, various support circuits 606 and a memory 608. The CPU 604 may comprise one or more commercially available microprocessors or microcontrollers that facilitate data processing and storage. Various support circuits 606 facilitate operation of the CPU 604 and may include clock circuits, buses, power supplies, input/output circuits and/or the like. The memory 608 includes a read only memory, random access memory, disk drive storage, optical storage, removable storage, and the like. The memory 608 includes various data, such as sensor array data 610. The memory 608 includes various software packages, such as automated vehicle software 612 for controlling the movement of an automated vehicle, for example a forklift, and storing laser scanner data and image data as the sensor array data 108.

The central computer 106 is a type of computing device (e.g., a laptop computer, a desktop computer, a Personal Desk Assistant (PDA) and the like) that comprises a central processing unit (CPU) 616, various support circuits 618 and a memory 620. The CPU 616 may comprise one or more commercially available microprocessors or microcontrollers that facilitate data processing and storage. Various support circuits 618 facilitate operation of the CPU 616 and may include clock circuits, buses, power supplies, input/output circuits and/or the like. The memory 620 includes a read only memory, random access memory, disk drive storage, optical storage, removable storage, and the like. The memory 620 includes various data, such as model information 622 and orientation information 624. The memory 620 includes various software packages, such as a manager 626, an object recognition process 628 and an environment sensing module 630.

The manager 626 includes software code (e.g., processor executable instructions) that is configured to instruct the automated vehicle, such as the forklift, to execute each and every task, for example transporting object loads. In some embodiments, the manager 626 uses the environment sensing module 630 to identify a particular object load. Such an object load may be manually placed within an industrial environment. The manager 626 generates path information 632 to the particular object load and a target destination. The manager 626 communicates the path information 632 to the automated vehicle software 612, which moves the automated vehicle along the designated path.

In some embodiments, the manager 626 implements a finer level of control over automated vehicle operation. For example, the manager 626 may instruct the automated vehicle software 612 to engage an unstable object load, such as a broken pallet or obstructed entry points. The manager 626 instructs the environment sensing module 626 to continuously generate the orientation information 624 during which the automated vehicle software 612 adjusts lifting element positions.

The network 602 comprises a communication system that connects computers by wire, cable, fiber optic, and/or wireless links facilitated by various types of well-known network elements, such as hubs, switches, routers, and the like. The network 602 may employ various well-known protocols to communicate information amongst the network resources. For example, the network 602 may be part of the Internet or intranet using various communications infrastructure such as Ethernet, WiFi, WiMax, General Packet Radio Service (GPRS), and the like.

In some embodiments, the model information 622 indicates attributes associated with various types of warehouse structures, such as units, pallets, rack systems, conveyers and object loads (e.g., a pallet supporting one or more units). The model information 622 may include dimensions (e.g., a size and/or a shape), a type and an ISO standard version associated with a particular pallet, object or rack system. For example, the model information 622 associated with the particular pallet may include a pallet type (e.g., stringer, block and/or the like), a corresponding ISO standard (e.g., the ISO Standard 6780), length/width measurements as well as locations of entry points (i.e., apertures) intended for forklift engagement.

The sensor array 108 is communicable coupled to the mobile computer 104, which is attached to an automated vehicle, such as a forklift (e.g., the forklift 200 of FIG. 2). The sensor array 108 includes a plurality of devices 614 for monitoring a physical environment and capturing data associated with various objects, which is stored by the mobile computer 104 as the sensor array data 610. In some embodiments, the sensor array 108 may include any combination of one or more laser scanners and/or one or more cameras. In some embodiments, the plurality of devices 614 may be mounted to the automated vehicle. For example, a laser scanner and a camera may be attached to a lift carriage at a position above the forks. Alternatively, the laser scanner and the camera may be located below the forks. The plurality of devices 614 may also be distributed throughout the physical environment at fixed positions.

In some embodiments, the sensor array data 610 includes an aggregation of data transmitted by the plurality of devices 614. In one embodiment, the one or more cameras transmit image data and/or video data of the physical environment that are relative to a vehicle. In another embodiment, the one or more laser scanners (e.g., three-dimensional laser scanners) analyze objects within the physical environment and capture data relating to various physical attributes, such as size and shape. The captured data can then be compared with three-dimensional object models. The laser scanner creates a point cloud of geometric samples on the surface of the subject. These points can then be used to extrapolate the shape of the subject (i.e., reconstruction). The laser scanners have a cone-shaped field of view. While the cameras record color information associated with object surfaces within each and every field of views, the laser scanners record distance information about these object surfaces.

The data produced by the laser scanner indicates a distance to each point on each object surface. Based on these distances, the object recognition process 628 determines a three dimensional position of the each point in a local coordinate system relative to each laser scanner. The environment sensing module 630 transposes each three-dimensional position to be relative to the vehicle. The laser scanners perform multiple scans from different perspectives in order to determine the points on the each and every object surface. The object recognition process 628 normalizes the data produced by the multiple scans by aligning the distances along a common reference system. Then, these software modules merge the object surfaces to create a model of the objects within a partial field of view.

The environment sensing module 630 includes software code (e.g., processor-executable instructions) for generating the orientation information 624 according to various embodiments. As described in the present disclosure, the orientation information 624 includes various measurements indicating angular and linear displacement about the x, y and z-axes of certain objects. In some embodiments, the environment sensing module 630 may define an entry point orientation associated with a pallet or a rack system shelf. In another embodiment, the environment sensing module 630 may define a destination orientation associated with a target destination of an object load. The environment sensing module 630 instructs the automated vehicle software 612 to position one or more lifting elements in accordance with the orientation information 624. On a forklift, for example, the environment sensing module 630 may position two forks using the various measurements.

Alternatively, the environment sensing module 630 communicates the orientation information 624 to the mobile computer 104 in order to provide feedback for a human operation. In some embodiments, the mobile computer 104 presents a location of the object load within the physical environment as well as the entry point orientation. For example, the human operator may incorrectly gauge the object load orientation when placed at a considerable height. Using manual controls, the human operator positions one or more lifting elements accordingly. The environment sensing module 624 recognizes such a human error and responds by communicating a correct entry point orientation. Subsequently, the human operator repositions the one or more lifting elements and engages the object load. In some embodiments, the automated vehicle software 612 automatically repositions the one or more lifting elements in response to the incorrect object load orientation. Thus, the orientation information 624 serves to rectify incorrect object load orientations and guide the human operator.

Figure 7:
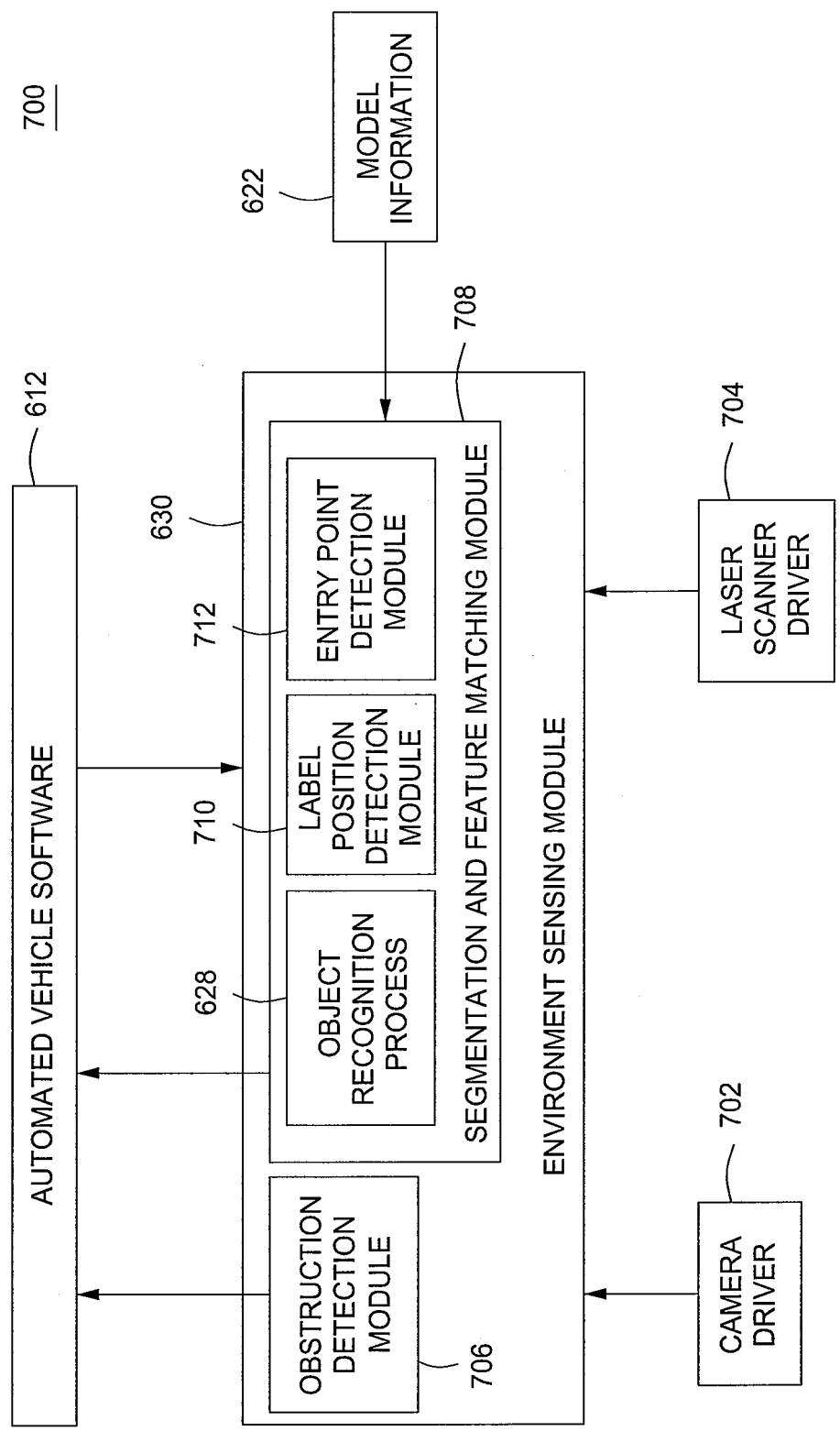
FIG. 7 is a functional block diagram that illustrates a task automation system according to various embodiments of the present invention.

FIG. 7 is a functional block diagram that illustrates a task automation system 700 using orientation information according to various embodiments of the present invention.

The task automation system 700 utilizes a sensor array that includes various devices for capturing data associated with one or more objects. In some embodiments, the task automation system 700 employs device drivers for accessing and communicating the captured data from the various devices. For example, the environment sensing module 630 invokes a camera driver 702 and a laser scanner driver 704 for the purpose of capturing image/video data and laser scanner data, respectively. The image/video data and the laser scanner data are processed by the environment sensing module 630, which computes various orientation or pose measurements and then, communicates such information to the automated vehicle software 612. Any required dimensions of an object, such as a pallet, or barcode types are recorded in the model information 622.

In some embodiments, the environment sensing module 630 includes an obstacle detection module 706 and a segmentation and feature matching module 708. The segmentation and feature matching module 708 includes the object recognition process 628, a label position detection module 710 and an orientation detection module 712. The label position detection module 710 includes software code (e.g., processor-executable instructions) for examining image data for a barcode or a label. The orientation detection module 712 includes software code (e.g., processor-executable instructions) that is configured to determine a relative pose associated with an object load (i.e., one or more products) and examine a target destination for obstacles. The orientation detection module 712 also determines if the object load is correctly placed on the forks.

Figure 8:
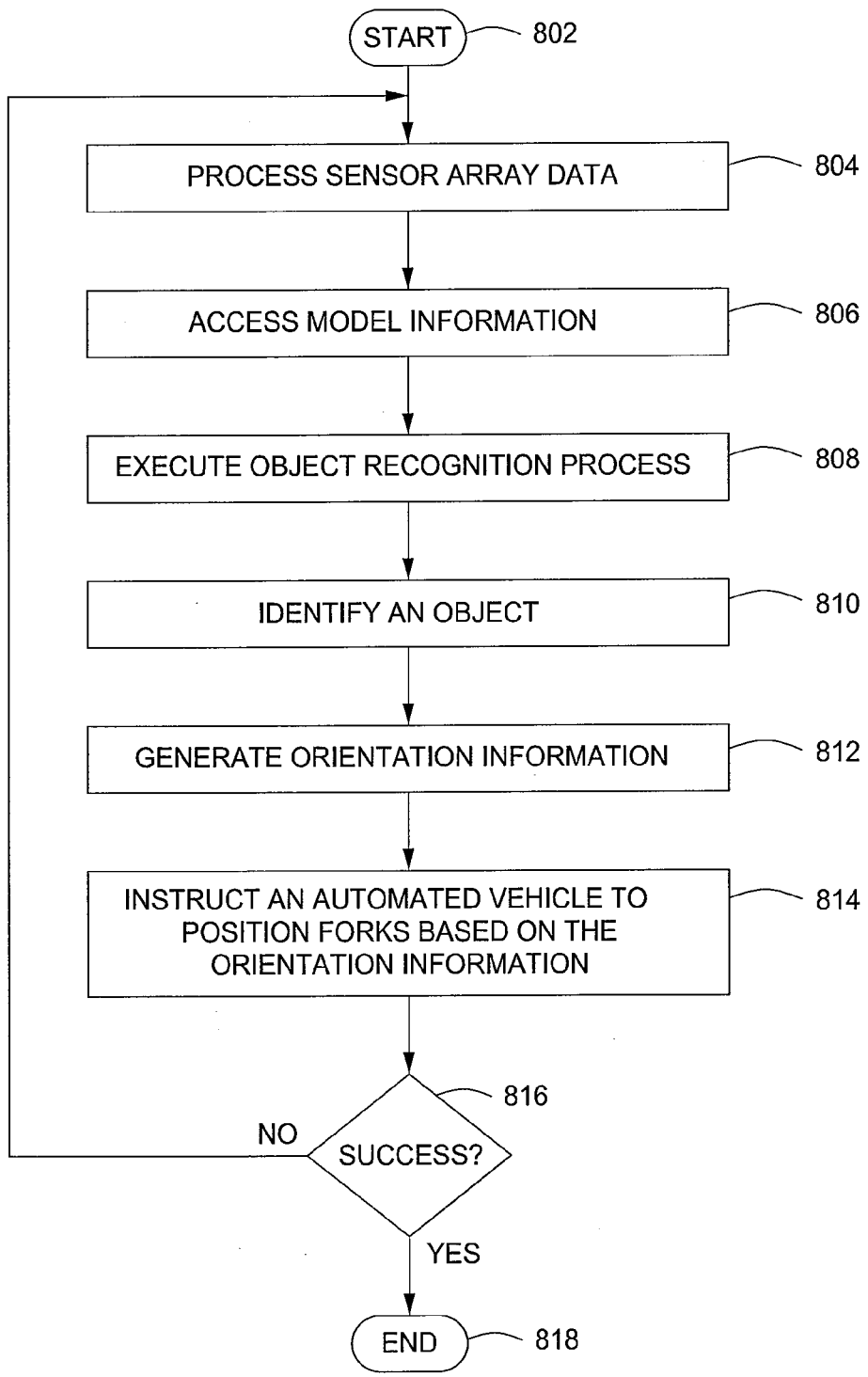
FIG. 8 is a flow diagram of a method for sensing object load engagement, transportation and disengagement by automated vehicles according to various embodiments of the present invention.

FIG. 8 is a flow diagram of a method 800 for sensing object load engagement, transportation and disengagement by automated vehicles according to various embodiments of the present invention. An environment sensing module within a central computer performs the method 800 according to some embodiments. The method 800 starts at step 802 and proceeds to step 804.

At step 804, sensor array data is processed. As explained in the present disclosure, a sensor array (e.g., the sensor array 108 of FIG. 1 and/or the sensor head 320 of FIG. 3) includes various devices, such as a laser scanner and/or a camera, for capturing data associated with various objects. These devices transmit image data and/or laser scanner data, which is stored in a mobile computer as the sensor array data (e.g., the sensor array data 610 of FIG. 6) according to some embodiments. The environment sensing module accesses the sensor array data within the mobile computer. At step 806, model information is accessed. The model information (e.g., the model information 622 of FIG. 6) may include a database maintaining physical attributes (e.g., dimensions, shapes and/or the like) associated with various object models, such as pallet models, load models, rack system models and/or the like. The model information is stored in the central computer and accessed by the environment sensing module.

At step 808, an object recognition process is executed. Various software modules, such as the environment sensing module (e.g., the environment sensing module 630 of FIG. 6), perform the object recognition process (e.g., the object recognition process 628 of FIG. 6) by comparing the sensor array data with the various object models as described in the present disclosure. For example, the object recognition process may search for an object model, such as a pallet model, having similar or identical dimensions (e.g., length and width of entry points) as a particular object, such as a pallet (e.g., the pallet 112 of FIG. 1). As another example, the object recognition process may utilize feature extraction processing techniques, such as edge detection, to identify the particular object, such as a rack system.

At step 810, an object is identified. By correlating the laser scanner data with the image data, the object recognition process identifies an object model matching the object being analyzed. At step 812, orientation information is generated. Once the object recognition process identifies a matching object model, such as a matching pallet model, an environment sensing module (e.g., the environment sensing module 630 of FIG. 6) fits the matching object model against the sensor array data and computes various pose or orientation measurements as explained in the present disclosure.

At step 814, an automated vehicle is instructed to position one or more lifting elements, such as one or more forks (e.g., the forks 302 of FIG. 3), based on the orientation information. In some embodiments, the environment sensing module communicates the orientation information to the automated vehicle software, which directs the lifting elements to a position defined by the orientation measurements. The environment sensing module instructs the automated vehicle software (e.g., the automated vehicle software 612 of FIG. 6) to move the forks into an orientation that is optimal for engaging the particular object, such as a pallet, and/or placing the object load at the target destination. At step 816, the method 800 ends.

Figure 9:
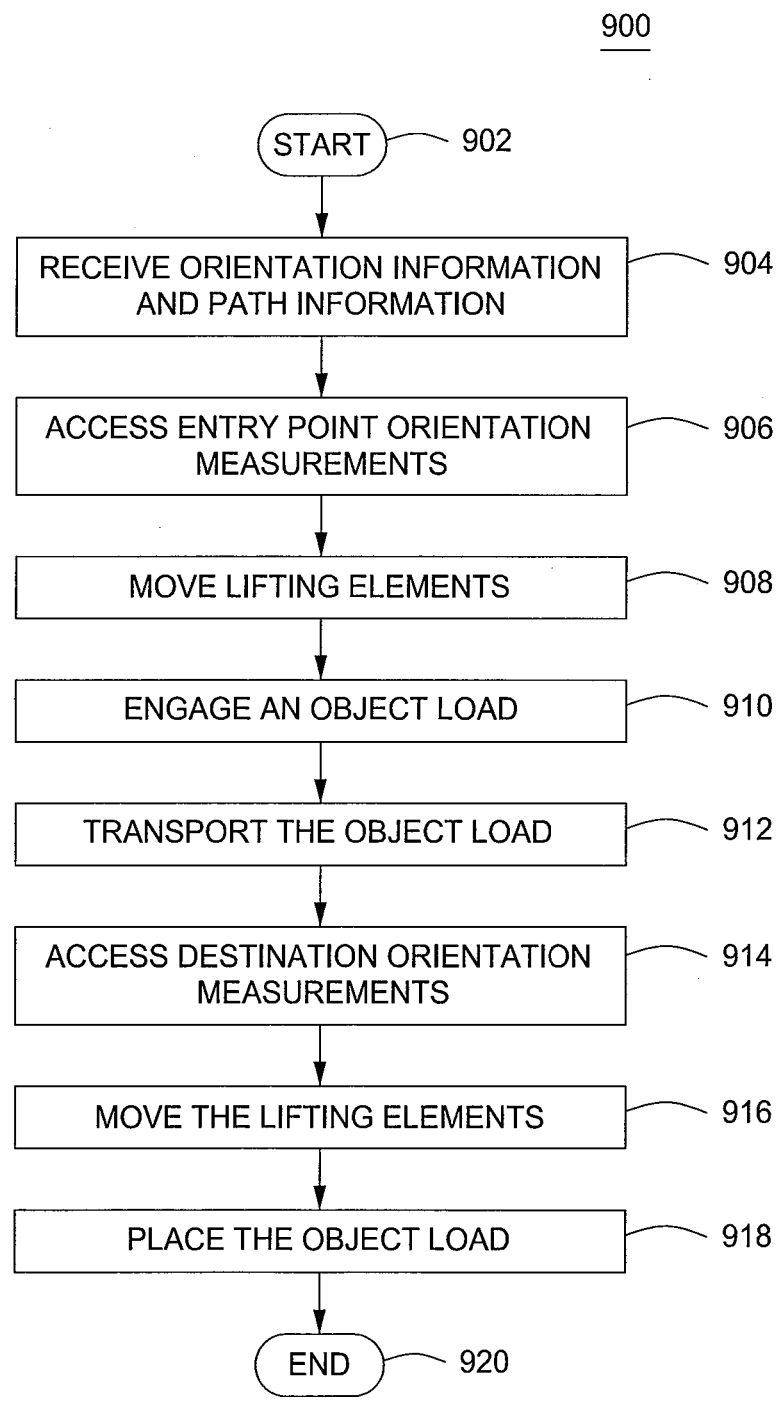
FIG. 9 is a flow diagram of a method for positioning lifting elements within an automated vehicle based on orientation information according to various embodiments.

FIG. 9 is a flow diagram of a method 900 for positioning lifting elements within an automated vehicle based on orientation information according to one or more embodiments. The method 900 may be performed by the automated vehicle software within a mobile computer.

The method 900 starts at step 902 and proceeds to step 904. At step 904, orientation information and path information are received. In some embodiments, the path information is used to perform a task, such as engaging and transporting an object load. For example, the automated vehicle software receives a first path to a pallet (e.g., the pallet 112 of FIG. 1) having a plurality of units (e.g., the plurality of units 114 of FIG. 1) as well as a second path from the pallet to a target destination. As such, the automated vehicle software moves an automated vehicle along the first path, engages the pallet and then, moves to the target destination along the second path.

At step 906, entry point orientation measurements associated with the object load are accessed. In some embodiments, the orientation information (e.g., the orientation information 324 of FIG. 3) includes various linear and angular displacement measurements between the automated vehicle (e.g., the forklift 200 of FIG. 2) and the object load (e.g., the object load 402 of FIG. 4). At step 908, lifting elements are moved in accordance with the entry point orientation measurements. For example, the automated vehicle software positions the lifting elements into an orientation that matches the entry point orientation measurements as explained in the present disclosure. At step 910, the object load is engaged.

At step 912, the object load is transported to a destination. For example, the automated vehicle lifts and transports the pallet supporting several units to a target destination, such as a rack system shelf or another pallet. Using the path information, the automated vehicle software moves the automated vehicle to the target destination. At step 914, destination orientation measurements are accessed. At step 916, the lifting elements are moved in accordance with the destination orientation measurements. At step 918, the object load is placed at the destination. At step 920, the method ends.

Figure 10:
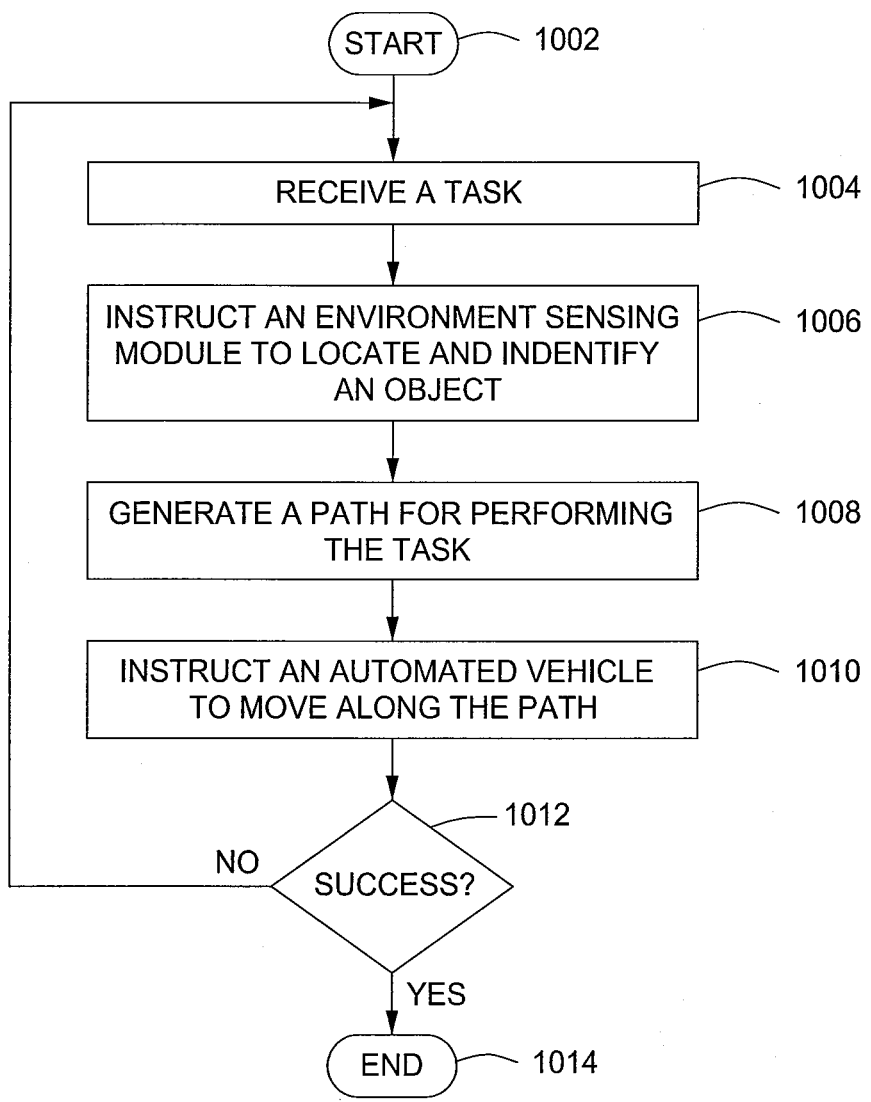
FIG. 10 is a flow diagram of a method for performing a task using an environment sensing module according to various embodiments.

FIG. 10 is a flow diagram of a method 1000 for performing a task using an environment sensing module according to various embodiments. The method 1000 may be performed by a manager (e.g., the manager 626 of FIG. 6) within a central computer (e.g., the central computer 106 of FIG. 1).

The method 1000 starts at step 1002 and proceeds to step 1004. At step 1004, a task is received. For example, the manager may be instructed to find and move an object load (e.g., the object load 402 of FIG. 4) to a target destination. At step 1006, an environment sensing module is instructed to locate and identify the object load. The environment sensing module (e.g., the environment sensing module 630 of FIG. 3) applies image processing techniques on images of the industrial environment to identify the object load. For example, the environment sensing module may combine consecutive images to identify three-dimensional objects within a camera field of view. Alternatively, the environment sensing module may employ a barcode or a radio frequency identification (RFID) reader (e.g., the device 618 of FIG. 3) to identify the object load.

At step 1008, a path for performing the task is generated. At step 1010, an automated vehicle is instructed to move along the path. In some embodiments, the manager communicates the path to automated vehicle software (e.g., the automated vehicle software 616 of FIG. 6), which controls automated vehicle steering. At step 1012, a determination is made as to whether the automated vehicle successfully performed the task. The automated vehicle software returns indicia of the automated vehicle performance. The manager processes the indicia and determines whether the automated vehicle successfully completed the given task. If the automated vehicle successfully performed the given task, the method 1000 proceeds to step 1014. At step 1014, the method ends. If, on the other hand, the automated vehicle did not successfully perform the given task, the method 1000 returns to step 1004.

While the foregoing is directed to embodiments of the present invention, other and further embodiments of the invention may be devised without departing from the basic scope thereof, and the scope thereof is determined by the claims that follow.

The invention claimed is:

1. A method of operating a vehicle comprising a lift carriage to engage or disengage an object load in a physical environment comprising a warehouse rack system, the method comprising:

analyzing a plurality of objects that are placed throughout the physical environment by processing data that is transmitted from a sensor array attached to the lift carriage of the vehicle;

executing an object recognition process on the sensor array data to identify the rack system by comparing rack system models with the sensor array data;

utilizing the rack system identification and a software module resident on a mobile computer coupled to the vehicle or a central computer coupled to the sensor array via a network to align a lifting element of the vehicle with entry points for a pallet or a shelf within the rack system; and operating the vehicle to engage or disengage the object load with the aligned lifting element.

2. The method of claim 1 wherein:

the vehicle comprises lifting forks and the sensor array is positioned below the lifting forks;

the method comprises utilizing a software module to determine if the target destination is clear of obstructions and disengaging the object load if the target destination is clear of obstructions; and the software module is resident on (i) a mobile computer coupled to the vehicle or (ii) a central computer coupled to the sensor array via a network.

3. The method of claim 1 wherein the method comprises: engaging an object load; and utilizing a software module resident on a mobile computer coupled to the vehicle or a central computer coupled to the sensor array via a network to compute a distance to a center of the engaged object load; and using the computed a distance to a center of the engaged object load and a stored displacement measurement between the vehicle and the engaged object load to calibrate the sensor array.

4. The method of claim 1 wherein the method further comprises:
scanning the object load while moving the lift carriage and the sensor array vertically;
executing an object recognition process on the sensor array data to identify a matching pallet model;
engaging or disengaging the object load based on the identification of the matching pallet model.

5. The method of claim 1 wherein the method further comprises utilizing a software module to define an entry point orientation associated with a shelf within the rack system, wherein the software module is resident on (i) a mobile computer coupled to the vehicle or (ii) a central computer coupled to the sensor array via a network.

6. The method of claim 1 wherein:
the sensor array comprises a camera attached to the lift carriage of the vehicle; and
the sensor array data comprises data captured by the laser scanner and the camera.

7. The method of claim 1 wherein:
the sensor array comprises a laser scanner and a camera attached to the lift carriage of the vehicle; and
the sensor array data comprises data captured by the laser scanner and the camera.

8. The method of claim 7 wherein the laser scanner and the camera operate with a light to enhance obstruction identification.

9. The method of claim 1 wherein the sensor array comprises a laser scanner and a camera attached to the lift carriage of the vehicle as a moveable sensor head attached to a pair of guide rails.

10. The method of claim 9 wherein a ball screw is utilized to raise or lower the sensor head or a driven linear slide table is employed to transport the sensor head.

11. The method of claim 9 wherein:
the vehicle comprises lifting forks and a drive motor connected to a gear, the gear engaging a rack in a rack and pinion arrangement; and
the method comprises utilizing the rack and pinion arrangement to move the sensor head to a location above the lifting forks, below the lifting forks, or both.

12. The method of claim 11 wherein the method comprises rotating the sensor head with the drive motor when capturing the sensor array data in order to identify objects or object loads that are not directly aligned with the forks.

13. The method of claim 1 wherein:
the sensor array comprises a laser scanner and a camera attached to the lift carriage of the vehicle;
the laser scanner and the camera are co-linear and orthogonal in the horizontal plane and coplanar in the vertical plane to an automated vehicle axis; and
the method comprises using a software module resident on a mobile computer coupled to the vehicle or a central computer coupled to the sensor array via a network to automatically cross correlate information between the laser scanner and the camera.

14. The method of claim 1 wherein:
the sensor array comprises a laser scanner and a camera attached to the lift carriage of the vehicle;
the method comprises using a software module to use geometric transforms to cross correlate information between the laser scanner and the camera; and
the software module is resident on (i) a mobile computer coupled to the vehicle or (ii) a central computer coupled to the sensor array via a network.

15. A system for operating an automated vehicle to engage or disengage an object load in a physical environment comprising a warehouse rack, the system comprising a mobile computer coupled to the vehicle, a central computer, and a sensor array attached to a lift carriage of the vehicle, wherein:
the mobile computer, the central computer, and the sensor array are coupled to each other through a network; and
software modules within the central computer, the mobile computer, or both, process data that is transmitted from the sensor array to facilitate object load engagement or disengagement by
executing an object recognition process on the sensor array data to identify the rack system by comparing rack system models with the sensor array data,
utilizing the identified rack system identification and a software module resident on a mobile computer coupled to the vehicle or a central computer coupled to the sensor array via a network to align a lifting element of the vehicle with entry points for a pallet or a shelf within the rack system, and
engaging or disengaging the object load with the aligned lifting element.

* * * * *

UNITED STATES PATENT AND TRADEMARK OFFICE
CERTIFICATE OF CORRECTION

PATENT NO. : 8,538,577 B2  
APPLICATION NO. : 12/718620  
DATED : September 17, 2013  
INVENTOR(S) : Jamie Bell et al.

Page 1 of 1

It is certified that error appears in the above-identified patent and that said Letters Patent is hereby corrected as shown below:

Title Page

Item (75) Inventors: "Jamie Bell, Auckland (NZ);
    Kashyap Chandrasekar, Auckland (NZ);
    Andres Evan Graham, Waitakere (NZ);
    David Charles Howse, North Shore (NZ)"

should read:

Item (75) Inventors: --Jamie Bell, Auckland (NZ);
    Kashyap Chandrasekar, Auckland (NZ);
    Andrew Evan Graham, Waitakere (NZ);
    David Charles Howse, North Shore City (NZ)--; and In the Claims Col. 15, Claim 3, Line 1, "using the computed a distance" should read
        --using the computed distance--.

Signed and Sealed this
Twenty-fourth Day of June, 2014

Michelle K. Lee
*Deputy Director of the United States Patent and Trademark Office*